US009426200B2

(12) United States Patent  
Buerner (10) Patent No.: US 9,426,200 B2  
(45) Date of Patent: Aug. 23, 2016

(54) UPDATING DYNAMIC CONTENT IN CACHED RESOURCES

(71) Applicant: Harald Buerner, Mannheim (DE)

(72) Inventor: Harald Buerner, Mannheim (DE)

(73) Assignee: SAP SE, Walldorf (DE)

( * ) Notice: Subject to any disclaimer, the term of this patent is extended or adjusted under 35 U.S.C. 154(b) by 375 days.

(21) Appl. No.: 13/796,764

(22) Filed: Mar. 12, 2013

(65) Prior Publication Data

US 2014/0280691 A1 Sep. 18, 2014

(51) Int. Cl.
*G06F 15/16* (2006.01)
*H04L 29/08* (2006.01)

(52) U.S. Cl.
CPC ..................... *H04L 67/02* (2013.01)

(58) Field of Classification Search
CPC ............... H04L 29/0809; H04L 29/06; H04L 29/08072
USPC ......................................................... 709/217
See application file for complete search history.

(56) References Cited

U.S. PATENT DOCUMENTS

| | | | |
|---|---|---|---|
| 7,269,784 B1 * | 9/2007 | Kasriel et al. | 715/205 |
| 8,996,653 B1 * | 3/2015 | Eriksen et al. | 709/217 |
| 2005/0033926 A1 * | 2/2005 | Dumont | 711/138 |
| 2005/0165644 A1 * | 7/2005 | Beyda et al. | 705/14 |
| 2006/0104174 A1 * | 5/2006 | Kelly et al. | 369/47.1 |
| 2007/0043693 A1 * | 2/2007 | Krieg | 707/1 |
| 2011/0138337 A1 | 6/2011 | Walter et al. | |
| 2012/0191804 A1 * | 7/2012 | Wright | G06F 17/30902 709/217 |
| 2012/0203865 A1 * | 8/2012 | Graham, Jr. | 709/219 |

OTHER PUBLICATIONS

Holmedahl, V. ; Smith, B. ; Tao Yang, Cooperative caching of dynamic content on a distributed Web server, Jul. 28-31, 1998, IEEE, The Seventh International Symposium on High Performance Distributed Computing, 1998. Proceedings. pp. 243-250.*

Challenger, J. ; Iyengar, A. ; Witting, K. ; Ferstat, C.; Reed, P., A publishing system for efficiently creating dynamic Web content, IEEE, INFOCOM 2000. Nineteenth Annual Joint Conference of the IEEE Computer and Communications Societies. Proceedings. IEEE (vol. 2 ), pp. 844-853.*

* cited by examiner

*Primary Examiner* — June Sison  
*Assistant Examiner* — Dixon Dabipi  
(74) *Attorney, Agent, or Firm* — Fish & Richardson P.C.

(57) ABSTRACT

The disclosure generally describes computer-implemented methods, software, and systems for rendering content. One method includes: receiving a request for content for a previously-provided resource, the request including an entity tag, and the resource including dynamic and static content; generating delta information identifying the change for inclusion in a cookie associated with the resource where only a portion of the dynamic content has changed, the delta information included in the cookie associated with a particular location of the corresponding dynamic content within the resource; and providing a response that includes the cookie for updating the dynamic content. Information stored in the cookie is used by the requesting client to update portions of dynamic content while maintaining static portions based on a cached version of the static portions.

19 Claims, 4 Drawing Sheets

UPDATING DYNAMIC CONTENT IN CACHED RESOURCES

TECHNICAL FIELD

The present disclosure relates to computer-implemented methods, software, and systems for updating cached content, including dynamic portions of the content.

BACKGROUND

Resources, such as web pages that are used in browsers and/or other applications, can include different types of content. For example, a web page can include text, images, graphics, video and other formats. Some web pages can include static content, for example, that may be changed infrequently by a publisher of the content, where the static content may be unlikely to change between successive requests for the content (e.g., an hour or less apart, as well as longer). Some web pages can include dynamic content, such as content that may change every minute or even more frequently. Such web pages are typically not cached because the data can change frequently. Web pages can be conditionally buffered and updated in their entirety if out-of-date.

SUMMARY

The disclosure generally describes computer-implemented methods, software, and systems for providing instructions for updating dynamic content in a cached resource. As an example, a web page requested by a client from a server may be a resource that includes both static and dynamic content. Subsequently, when the server receives a request for content for the previously-provided resource, the request can include, for example, an entity tag. Using the entity tag, the server can generate delta information identifying a change in dynamic content for inclusion in a cookie associated with the resource where only at least a portion of the dynamic content associated with the resource has changed. The delta information that is included in the cookie is associated with a particular location of the corresponding dynamic content within the resource. The server can provide a response that includes the cookie for use in updating the dynamic content. At the requesting client, the information stored in the cookie can be used to update the portions of dynamic content while maintaining the static portions based on a cached version of the static portions of the resource.

The present disclosure relates to computer-implemented methods, software, and systems for providing instructions for updating dynamic content in a cached resource. One computer-implemented method includes: receiving a request for content for a resource that was previously provided, where the request includes an entity tag, and where the resource includes dynamic and static content; generating delta information identifying the change for inclusion in a cookie associated with the resource, where only at least a portion of the dynamic content associated with the resource has changed, the delta information included in the cookie associated with a particular location of the corresponding dynamic content within the resource; and providing a response that includes the cookie for use in updating the dynamic content, where the information stored in the cookie is used by the requesting client to update the portions of dynamic content while maintaining the static portions based on a cached version of the static portions of the resource.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, the method further includes: prior to receiving the request for content for the resource: receiving a request for content for a resource that was previously provided, where the request includes an entity tag; generating static content and incorporating the static content into the response associated with the resource; setting the cookie associated with the resource to include at least one dynamic content location for identifying and for generating dynamic content; and providing the content in response to the request, including providing the cookie for use in rendering a cached version of the content.

In a second aspect combinable with any of the previous aspects, the method further includes: generating a resource identifier associated with the resource; determining a dynamic content type associated with the dynamic content; generating the dynamic data; incorporating the dynamic data into the cookie; and assembling an entity tag and including the entity tag in the response.

In a third aspect combinable with any of the previous aspects, the method further includes: determining an identifier associated with the cookie; reading data from the cookie; reading the resource identifier and the dynamic content type from the entity tag; generating dynamic data for the resource identified by the resource identifier and according to the dynamic data type; and updating the cookie with the dynamic data.

In a fourth aspect combinable with any of the previous aspects, the cookie identifier includes at least the resource identifier and either one of a suffix or a prefix.

In a fifth aspect combinable with any of the previous aspects, the resource has a unique cookie identifier.

In a sixth aspect combinable with any of the previous aspects, the entity tag is included in a hyper-text transfer protocol (HTTP) request header field in the request for content.

In a seventh aspect combinable with any of the previous aspects, the entity tag is included within an if-none-match header field of the HTTP request.

In an eighth aspect combinable with any of the previous aspects, the entity tag includes at least a version identifier, a resource identifier, and a dynamic data type.

In a ninth aspect combinable with any of the previous aspects, the method further includes comprising determining that a change to static content for the resource has occurred, the determination including comparing the version ID associated with the static content of the cached content with a version ID associated with the current version of the resource and providing the static content in its entirety for use in re-loading the page if the static portions have changed.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for updating cached content. For example, dynamic content on web pages can be updated without having to re-load the entire page, including the static portions that have not changed since the previous caching. In some implementations, information used for updating the dynamic content can be included in a cookie, and entity tags can be used when requesting the content so as to obtain the correct updated dynamic content from a server. For example, conditional get requests can be used for the validation of the static data portion of a web page, and cookies can be used as a data channel for updating the dynamic portion of the web page.

The subject matter described in this specification can be implemented in particular implementations so as to realize one or more of the following advantages. First, caching static data and updating dynamic data can reduce page re-generation time in the client, which can improve overall page-loading performance. Second, using resource identifiers (IDs), including as part of cookie IDs, can resolve cookie conflicts that might occur otherwise.

In some implementations, page invalidation, e.g., determining when a page needs to be updated, can be controlled by entity tags. Entity tags, for example, can be strings containing arbitrary data that can be attached to a web page's HTTP response as header field. Subsequently, the next time this page is requested, the browser can send an "if-none-match" header field along with the HTTP request. The "if-none-match" header field, for example, can contain the entity tag that was previously attached to, or associated with, that page before. Using the entity tag, it can be determined whether the corresponding page is still fresh or not. If the page is still fresh (i.e., the static content has not changed), then an HTTP response with a status 304 can be sent back to the browser to indicate that the browser can use the cached version of the page, though updated with dynamic content. Otherwise, if the page is no longer fresh, then the entire page will be re-generated and sent back with an HTTP status 200. Other ways can be used to invalidate pages.

Figure 1:
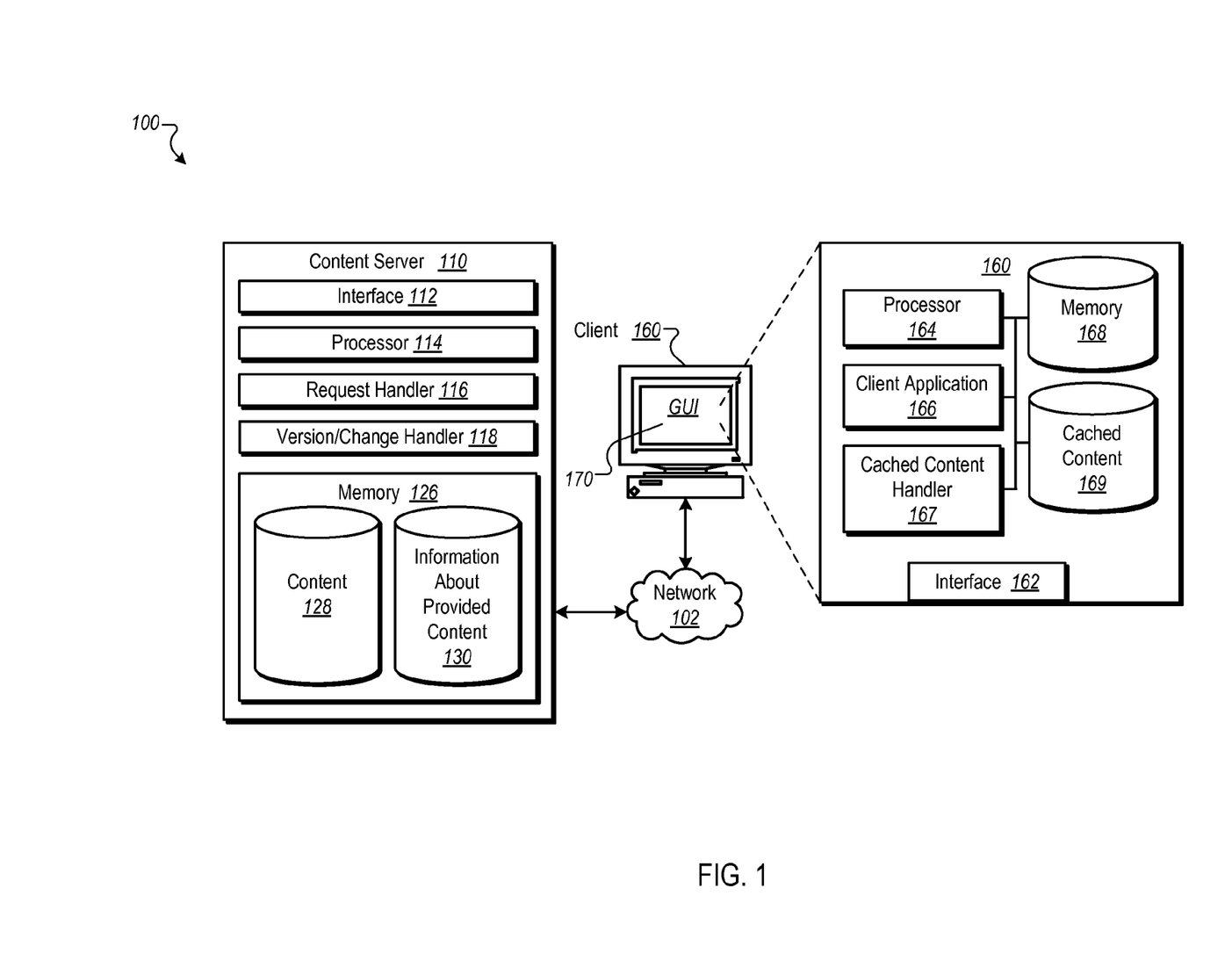
FIG. 1 is a block diagram illustrating an example environment for updating cached content.

FIG. 1 illustrates an example environment 100 for updating cached content. Specifically, the illustrated environment 100 includes at least one content server 110, and at least one client device 160, all of which are communicably coupled using a network 102. For example, a user interacting with a user interface presented on the client device 160 may view content provided by the content server 110.

The content server 110 comprises an electronic computing device operable to provide content 128. The content may be provided to one or more client devices 160, e.g., for presentation of content used in browsers, on web pages, or for other purposes. The content provided can include static and dynamic content. Using information about previously-provided content 130, for example, cached content 169 that is used on the client device 160 can be updated without re-loading an entire web page.

As used in the present disclosure, the term "computer" is intended to encompass any suitable processing device. For example, although FIG. 1 illustrates a single content server 110, the environment 100 can be implemented using two or more content servers 110. The environment 100 can also be implemented using computers other than servers, including a server pool. Indeed, components of the environment 100 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated components of the environment 100 may be adapted to execute any operating system, including Linux, UNIX, Windows, Mac OS®, Java™, Android™, iOS or any other suitable operating system. According to some implementations, components of the environment 100 may also include, or be communicably coupled with, an e-mail server, a Web server, a caching server, a streaming data server, and/or other suitable server(s). In some implementations, components of the environment 100 may be distributed in different locations and coupled using the network 102.

The content server 110 includes an interface 112, a processor 114, a request handler 116, a version/change handler 118, and a memory 126. The interface 112 is used by the content server 110 for communicating with other systems in a distributed environment, connected to the network 102 (e.g., the client device 160), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The request handler 116 can, for example, handle requests for content received from systems and/or devices external to the content server 110. For example, the request handler 116 can handle a request received from the client device 160 for content 128, such as search results responsive to a query, web pages, and other types of content. In response to the request, the request handler 116 can provide content 128 responsive to the request. For example, content provided in response to the request can be a web page that includes primarily static content as well as one or more portions of dynamic content. If the web page is a company's home web page, for example, the static content can include information that seldom changes (e.g., the majority of the page), and the dynamic content can include a stock price and/or news ticker that may be updated every five minutes.

The version/change handler 118 (or sub-components therein) can perform processing at the content server 110 that involves versions and changes associated with resources. For example, for a request for content received by the request handler 116, the version/change handler 118 can process an entity tag that accompanies the request. The entity tag can include, for example, a version identifier (ID) for identifying the static portion of a web page, a resource ID, and dynamic data type information. Using the entity tag, the version/ change handler 118 can determine if the static portion is out-of-date, whether the dynamic content identified by the resource ID is valid, and the type of dynamic data to include in a cookie that is returned with the content that is provided in response to the request. Based on that information, the version/change handler 118 can refresh the entire page if static portion requires changing, set a cookie associated with the request with the resource ID set as whatever the new data should be (e.g., based on the dynamic data type), and set the entity tag in the response for use by the client in subsequent requests. The request can then be provided to the client device 160 by the request handler 116. In some implementations, the dynamic data type can be optional, e.g., if there is only one type of dynamic data for the resource.

The resource ID is used to avoid cookie conflicts. In some implementations, the resource ID can be identified from the uniform resource locator (URL) associated with the request. The resource ID is part of the entity tag, so a cookie ID can be derived from it.

The dynamic data type can be used for the update functionality in the backend, e.g., in updating the dynamic content on a web page. Information identifying the specific dynamic data type associated with the dynamic content can be attached to a cookie.

A cached content handler 167 at the client device 160 can receive the response from the content server 110 and perform the processing at the client device 160 that is needed to maintain and use cached content 169. For example, when a resource, such as a web page, is received at the client device 160 for the first time, the cached content handler 167 can cache the content in the cached content 169. From there, the cached content 169 can be used to update the content presented in the GUI 170. The first time this occurs, the page is loaded in its entirety. However, after a request for the same content sent to the content server 110 and a subsequent response, the cached content handler 167 can update the dynamic portions of content using information included within the cookie that accompanies the response. For example, the cached content handler 167 can use dynamic content contained in the cookie to update the dynamic portion(s) of content. In some implementations, when multiple dynamic portions of content are to be updated, element IDs can be used to differentiate among the different dynamic portions. For example, the element IDs can be individual tags within the cookie, or the element IDs can be concatenated within cookie string values.

The content server 110 also includes the memory 126, or multiple memories 126. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the content server 110. Additionally, the memory 126 may include any other appropriate data, such as VPN applications, firmware logs and policies, firewall policies, a security or access log, print or other reporting files, as well as others. In some implementations, memory 126 includes the content 128 (described above) and information about provided content 130. Other components within the memory 126 are possible.

The illustrated environment of FIG. 1 also includes the client device 160, or multiple client devices 160. The client device 160 may be any computing device operable to connect to, or communicate with, at least the content server 110 over the network 102 using a wire-line or wireless connection. In general, the client device 160 comprises an electronic computer device operable to receive, transmit, process, and store any appropriate data associated with the environment 100 of FIG. 1.

The illustrated client device 160 further includes at least one client application 166. The client application 166 can be any type of application that allows the client device 160 to request and view content on the client device 160. In some implementations, the client application 166 can include a Web browser or any other application that may display or use content. In some implementations, the client application 166 can use parameters, metadata, and other information received at launch to access a particular set of data received from the content server 110. Once a particular client application 166 is launched, a user may view and interact with content presented on the client device 160.

The illustrated client device 160 further includes a cached content handler 167 for updating and accessing cached content on the client device 160. For example, the cached content handler 167 can be included in or accessed by the client application 166. As will be described in further detail below, the cached content handler 167 can use information in a cookie associated with content to update dynamic content on a web page without having to reload the entire webpage.

The illustrated client device 160 further includes an interface 162, a processor 164, and a memory 168. The interface 162 is used by the client device 160 for communicating with other systems in a distributed environment—including within the environment 100—connected to the network 102, e.g., the content server 110, as well as other systems communicably coupled to the network 102 (not illustrated). Generally, the interface 162 comprises logic encoded in software and/or hardware in a suitable combination and operable to communicate with the network 102. More specifically, the interface 162 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including JavaScript™, Hyper-Text Mark-up Language (HTML), C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 160 includes the processor 164. Although illustrated as the single processor 164 in FIG. 1, two or more processors 164 may be used according to particular needs, desires, or particular implementations of the environment 100. Each processor 164 may be a central processing unit (CPU), an application specific integrated circuit (ASIC), a field-programmable gate array (FPGA), or another suitable component. Generally, the processor 164 executes instructions and manipulates data to perform the operations of the client device 160. Specifically, the processor 164 executes the functionality required to send requests to, and process responses from, and the content server 110.

The illustrated client device 160 also includes a memory 168, or multiple memories 168. The memory 168 may include any memory or database module and may take the form of volatile or non-volatile memory including, without limitation, magnetic media, optical media, random access memory (RAM), read-only memory (ROM), removable media, or any other suitable local or remote memory component. The memory 168 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 160. Additionally, the memory 168 may include any other appropriate data, such as VPN applications, firmware logs and policies, firewall policies, a security or access log, print or other reporting files, as well as others.

The illustrated client device 160 is intended to encompass any computing device such as a smart phone, tablet computing device, PDA, desktop computer, laptop/notebook computer, wireless data port, one or more processors within these devices, or any other suitable processing device. For example, the client device 160 may comprise a computer that includes an input device, such as a keypad, touch screen, or other device that can accept user information, and an output device that conveys information associated with the client device 160, including digital data, visual information, or a graphical user interface (GUI) 170, as shown with respect to and included by the client device 160. The GUI 170 interfaces with at least a portion of the environment 100 for any suitable purpose, including generating a visual representation of a Web browser.

Figure 2:
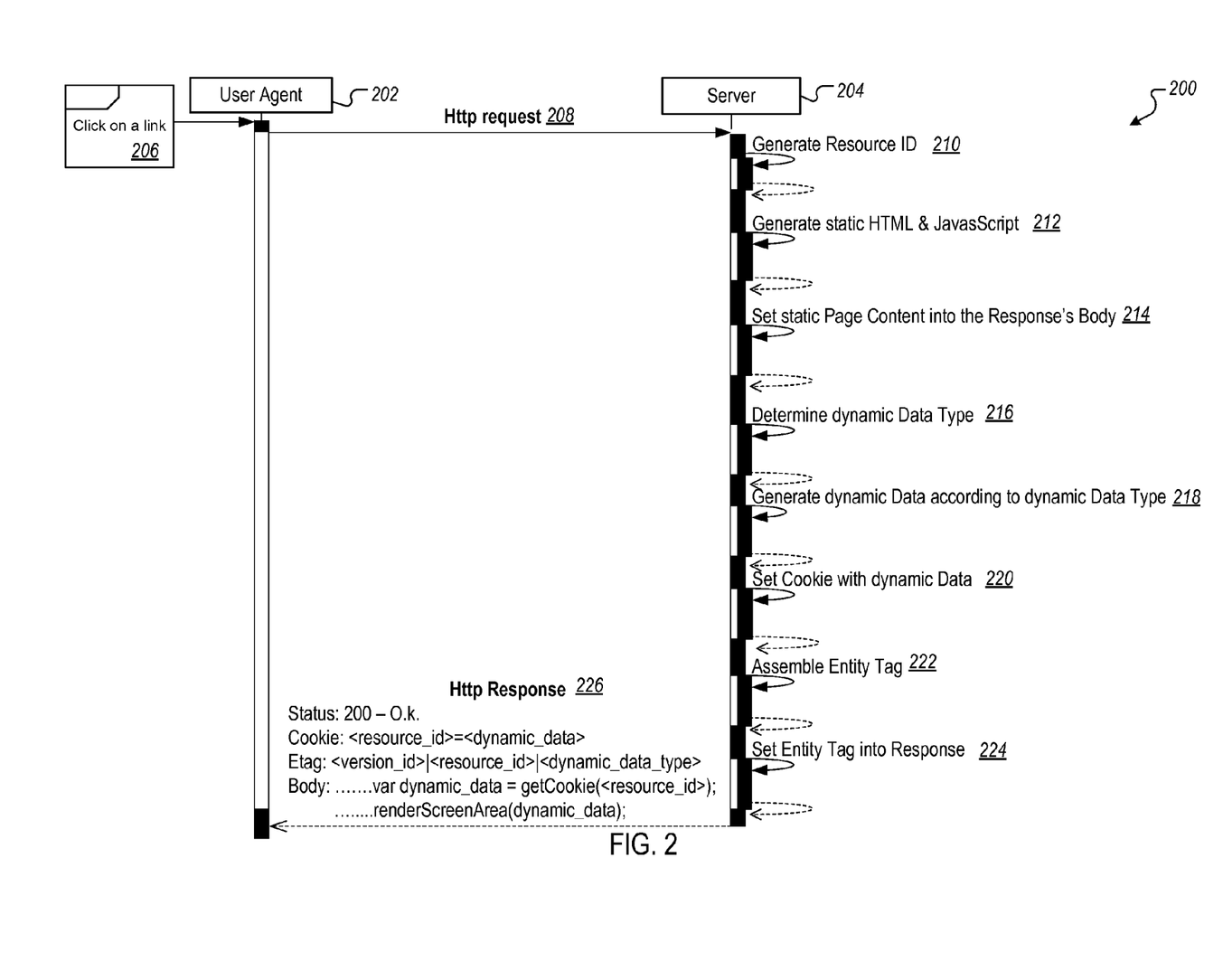
FIGS. 2-3 show example flows for updating cached content.
Figure 3:
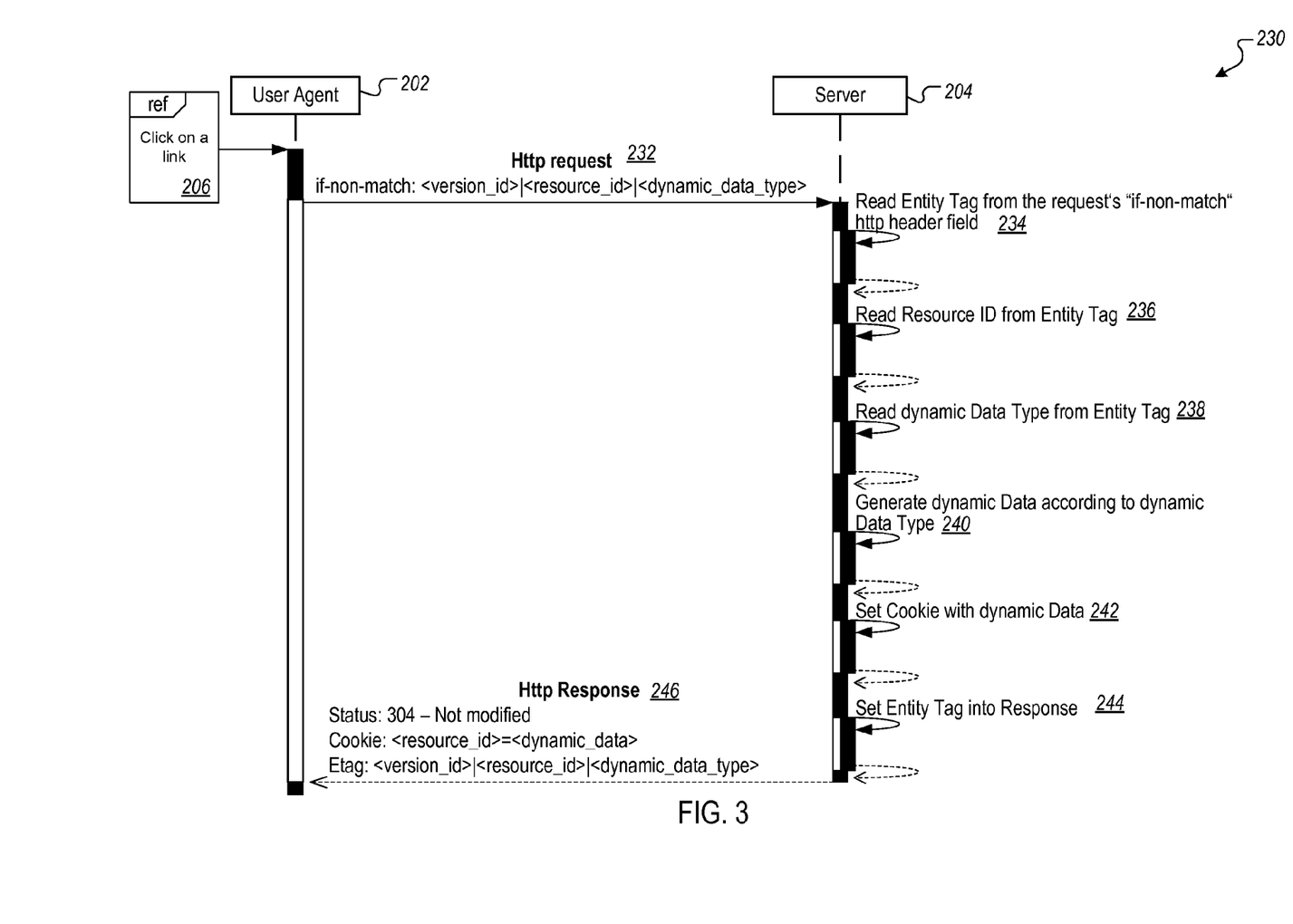

FIGS. 2-3 show example flows 200 and 230 for updating cached content. The flow 200 can be used, for example, for providing a web page that is not currently cached on the client device 160. The flow 230 can be used, for example, for providing a web page that is already cached on the client device 160, e.g., in a browser. In both of the flows 200 and 230, action steps can occur between a user agent 202, e.g., client device 160 or other front-end client, and a server 204, e.g., the content server 110 or some other back-end server. Other steps and/or different orders of steps can be used. Some or all of the server side actions can be performed, for example, by the version/change handler 118. Some or all of the client side actions can be performed, for example, by the cached content handler 167.

Referring to FIG. 2, a user's click on a link 206 or other action that requests content can occur, such as at the client device 160. As a result, an HTTP request 208 can be sent, for example, from the user agent 202 to the server 204. The HTTP request 208 can be for a resource, such as a corporate web page.

The server 204 can receive the HTTP request 208 and generate a resource ID associated with the resource. Because, for example, no entity tag exists yet for the resource, the web page can be entirely be regenerated. A unique resource ID is generated (210) because it is needed for subsequent requests for the same resource, e.g., once the resource has been cached on the client device 160. Static HTML and JavaScript™ code is generated (212) that is associated with the static content portion of the web page. The unique resource ID (e.g., "var resourceId='<unique_id>';") can be included within the JavaScript™ code. The web page content can be attached (214) to an HTTP response body, e.g., the response that is built to respond to the HTTP request 208.

In addition to the static portion of the response being assembled, the dynamic portion can also be assembled. A determination of the dynamic data type (216) can be made as to what kind of dynamic data is to be generated. Dynamic data can be generated (218) in accordance with the determined dynamic data type. A cookie can be set (220) to include the dynamic data. The cookie name can be unique, e.g., incorporating the resource ID, so that each web page has its own unique cookie name that can enable, e.g., a dedicated data channel and storage for the retrieval of the web page's dynamic data.

The entity tag can be assembled (222) and set (224) into the HTTP response. The entity tag can contain the version ID of the static content portion, a dynamic data type identifier, and the resource ID. A response (226), e.g., the HTTP response, can be sent back to the user agent 202, e.g., the client device 160 or other front-end client. The response can include, for example, an HTTP status 200 (e.g., Ok).

Once the response is received, the client device 160 can render the web page using information in the response, including the static data in the body of the response and the dynamic data from the cookie. The client device 160 can store the resource ID and version ID for use in any subsequent requests for the same web page.

Referring to FIG. 3, a user's click on the link 206 or other action that requests content can occur, such as at the client device 160. As a result, an HTTP request 232 can be sent, for example, from the user agent 202 to the server 204. The HTTP request 232 can be for the same resource requested before, e.g., the corporate web page requested using the HTTP request 208.

The server 204 can receive the HTTP request 232. An example of the HTTP request 232 includes a header field, e.g., "if-none-match: <version_id>|<resource_id>|<dynamic_data_type>" which can request, for example, the resource identified by the resource ID. The resource is to be provided in its entirety, e.g., if the current version of the static portion of the resource on the server 204 does not match the version ID. If just the dynamic data is to be provided, or if the whole resource is to be provided, then the dynamic data type can indicate the type of dynamic data to be included in a response.

The HTTP request 232 can also include an entity tag. Specifically, the "if-none-match" HTTP header field can include the entity tag. For example, the entity tag can be a concatenation of the version ID, the resource ID, and the dynamic data type. The entity tag can be read (234), from which the resource ID (236) and the dynamic data type (238) can be extracted. Based on the specified dynamic data type, the dynamic data can be generated (240), e.g., that contains the dynamic data to be inserted into the web page. The dynamic data is set into a cookie (242), e.g., having a unique cookie identifier based on the resource ID. The entity tag that accompanied the HTTP request 232 is set (244) into the HTTP response 246, which is returned to the user agent 202.

The HTTP response 246 can include, for example, a status code 304, indicating that the static portion of the resource has not been modified.

At the user agent 202, the client device 160, for example, can update the web page. The update in this case does not reload the entire web page, as the static data portion of the web page is unchanged. However, the dynamic content on the web page is updated using the dynamic data from the cookie that accompanied the HTTP response 246.

Figure 4:
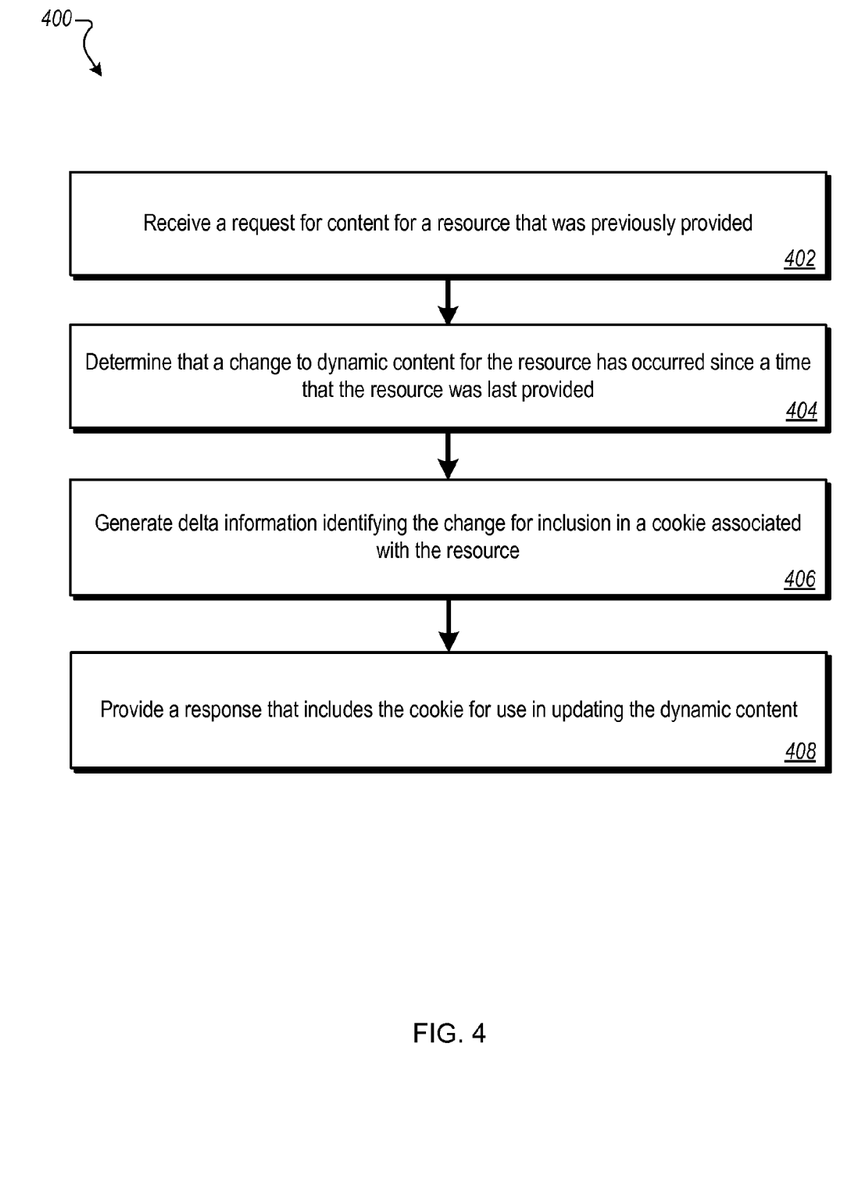
FIG. 4 is a flowchart of an example method for updating cached content.

FIG. 4 is a flowchart of an example method 400 for updating cached content. For clarity of presentation, the description that follows generally describes method 400 in the context of FIGS. 1 through 3. However, it will be understood that the method 400 may be performed, for example, by any other suitable system, environment, software, and hardware, or a combination of systems, environments, software, and hardware as appropriate. For example, the client device 160 and/or its components can be used to execute the method 400, e.g., using information accessed from the content server 110.

At 402, a request is received for content for a resource that was previously provided. The request includes an entity tag. The resource includes dynamic and static content. For example, the client device 160 can send a request for content to the content server 110 for a web page containing static and dynamic that was previously provided, such as a mutual fund web site home page that displays a current share price. The request that is sent can include an entity tag, e.g., that includes a version ID associated with the static content of the home page, the resource ID associated with the web page, and a dynamic data type associated with the share price.

In some implementations, additional steps occur prior to receiving the request for content for the resource. An initial request for content is received for the resource. Static content is generated and incorporated into the response associated with the resource. The cookie associated with the resource is set to include at least one dynamic content location for identifying and generating dynamic content. The content is provided in response to the request, including providing the cookie, for use in rendering a cached version of, the content. For example, the initial request for content can be the previous or first request for the mutual fund web site home page for which the content server 110 can generate static content for the majority of the home page. For such a request, the content server 110 can also set a cookie associated with the home page to include a location for accepting the dynamic content, e.g., the current share price. The content server 110 can provide the dynamic content and include it in the cookie. The content server 110 can provide the response and the cookie to the client device 160 for use by the client device 160 in rendering a cached version of, the home page. In this example, the first time that the mutual fund web site home page is provided, it can include the static content, which can be the majority of the content on the home page, and the current share price, which can be the smaller amount of dynamic content on the home page.

In some implementations, generating a resource identifier associated with the resource can include the following steps: a dynamic content type associated with the dynamic content is determined, the dynamic data is generated and incorporated into the cookie, and an entity tag is assembled and included in the response. For example, coincident with the generation of the resource ID associated with the home page, the content server 110 can determine that the dynamic content type is a type associated with the current stock price. Further, the current stock price, e.g., $43.96/share, is the dynamic data. The entity tag, including the resource ID, version ID, and dynamic data type, can be loaded into the response provided to the client device 160.

In some implementations, the entity tag can include at least a resource identifier and a dynamic data type. For example, the entity tag used for handling requests for the mutual fund web site home page can include a unique resource identifier for the home page and at least one dynamic data type. In the current example, because there is just one piece of dynamic data, e.g., the current share price, there is also just one dynamic data type, e.g., associated with the share price. In some implementations, when more than one piece of dynamic data exists, multiple dynamic data types or some other mechanism can be used. In some implementations, if there is just one type of dynamic data, the dynamic data type can be implied.

In some implementations, the entity tag can be included in a hyper-text transfer protocol (HTTP) request header field in the request for content. For example, the entity tag can be included within an if-none-match header field of the HTTP request, e.g., as shown in the HTTP request 232 of FIG. 3.

At 404, a determination is made that a change to dynamic content for the resource has occurred since a time that the resource was last provided. For example, the content server 110 can determine that the dynamic content has changed since the last time the client device 160 has requested the home page. In some implementations, it can be assumed that the dynamic content is always out-of-date, and dynamic content will always be read. For example, the dynamic content can be provided for each request by default.

In some implementations, determining that the change to dynamic content on the resource has occurred can include the following steps. An identifier associated with the cookie is determined, and data is read from the cookie. The resource identifier and the dynamic content type are read from the entity tag. Dynamic data is generated for the resource identified by the resource identifier and according to the dynamic data type. The cookie is updated with the dynamic data. For example, the content server 110 can base the generation of the cookie ID on the resource ID, e.g., as part of a cookie identification system that also uses either one of a suffix or a prefix in the cookie ID. The content server 110 can read the resource ID, e.g., for the home page, and the dynamic content type, e.g., related to the share price, from the entity tag that accompanies the request. The content server 110 can generate the dynamic content, e.g., the current share price, which can be loaded into the cookie.

At 406, delta information identifying the change is generated for inclusion in a cookie associated with the resource, where only at least a portion of the dynamic content associated with the resource has changed. The delta information is included in the cookie associated with a particular location of the corresponding dynamic content within the resource. For example, the content server 110 can generate delta information for the changed share price and include that information in a cookie associated with the home page. Each resource, for example, can have a unique cookie identifier, so that the cookie ID for the cookie associated with the home page is different from other cookie IDs, as well as for other web pages associated with the mutual fund. The delta information can identify, for example, the position on the home page for which the dynamic content appears, e.g., the place on the home page that displays the current share price.

At 408, a response is provided that includes the cookie for use in updating the dynamic content. The information stored in the cookie is used by the requesting client to update the portions of dynamic content while maintaining the static portions based on a cached version of the static portions of the resource. For example, the content server 110 can provide a response to the client device 160 that includes the cookie containing the share price information for updating the dynamic content portion of the home page. The client device 160 can then use the cached static content together with the dynamic information to update the resource. The client device 160 can also store the dynamic information for use in the next request to the content sever 110.

In some implementations, determining that a change to static content for the resource has occurred can include comparing the version ID associated with the static content of the cached content with a version ID associated with the current version of the resource, and the method 400 can further include providing the content in its entirety for use in re-loading the page if the static portions have changed. For example, the content server 110 can compare the version ID received in the request from the client device 160 to the version ID associated with the current version of the home page. If the version IDs do not match, then that indicates that the static content portion of the cached content on the client device 160 is out-of-date. If so, then the response provided by the content server 110 to the client device 160 can include the entire home page, which the client device 160 can use to re-load the entire page. The client device 160 can then cache the page for future operations. In some implementations, version IDs can exist for each type of dynamic data type.

In some implementations, it might occur that the very same universal resource locator (URL) is loaded into two pages, e.g., in a browser, and that these two pages are loaded exactly in parallel. Because these pages have exactly the same URL, they also have exactly the same resource ID and share the same cookies. Because of that, there might be conflicts with the dynamic data cookie. In some implementations, to avoid such possible conflicts, a fallback logic can be implemented. For example, whenever no dynamic data is passed to a web page via the cookie, although dynamic data may be expected, an Extensible Markup Language (XML) HTTP request (XHR), e.g., using AJAX, can be sent to the backend with which the missing dynamic data can be gathered exclusively.

In some implementations, some or all of the dynamic content can be stored on a client device, e.g., in the browser's local storage/cache on the client device 160. In some implementations, some or all of the dynamic content can be stored in the cookies, and the cookies can be sent to the content server 110 for potential modification on each request.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example environment 100 may use processes with additional, fewer and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving a request for content for a resource that was previously provided, wherein the request includes an entity tag, wherein the resource includes dynamic content and static content, and wherein the entity tag includes at least a version identifier associated with the static content, a resource identifier associated with the resource, and a dynamic data type;
determining, using the entity tag, whether the static content is out of date;
in response to determining that the static content is out of date:
  providing, using the resource identifier, the resource; and
  identifying a current version of the dynamic content for inclusion in a cookie associated with the resource;
in response to determining that the resource is not out of date:
  determining whether the dynamic content is invalid by determining, using the current version of the dynamic content, if the dynamic content has changed since a last time that the resource was requested;
  in response to determining that the dynamic content is invalid:
    generating, using the dynamic data type from the entity tag, a change to the dynamic content;
    updating the current version of the dynamic content; and
    generating delta information identifying the change for inclusion in the cookie associated with the resource, wherein only at least a portion of the dynamic content associated with the resource has changed, the delta information included in the cookie associated with a particular location of the corresponding dynamic content within the resource; and
providing a response that includes the cookie for use in updating the dynamic content, wherein the information stored in the cookie is used by the requesting client to update the portions of dynamic content while maintaining the static portions based on a cached version of the static portions of the resource.

2. The method of claim 1, further comprising:
prior to receiving the request for content for the resource:
  receiving a request for content for the resource;
  generating static content and incorporating the static content into the response associated with the resource;
  setting the cookie associated with the resource to include at least one dynamic content location for identifying and for generating dynamic content; and
  providing the content in response to the request, including providing the cookie, for use in rendering a cached version of, the content.

3. The method of claim 2, further comprising:
generating a resource identifier associated with the resource;
determining a dynamic content type associated with the dynamic content;
generating the dynamic content;
incorporating the dynamic content into the cookie; and
assembling an entity tag and including the entity tag in the response.

4. The method of claim 3, wherein determining that the change to content on the resource has occurred includes:
  determining an identifier associated with the cookie;
  reading data from the cookie;
  reading the resource identifier;
  reading the dynamic content type from the entity tag;
  generating dynamic content for the resource identified by the resource identifier and according to the dynamic data type; and
  updating the cookie with the dynamic content.

5. The method of claim 4, wherein the cookie identifier includes at least the resource identifier and either one of a suffix or a prefix.

6. The method of claim 1, wherein the resource has a unique cookie identifier.

7. The method of claim 1, wherein the entity tag is included in a hyper-text transfer protocol (HTTP) request header field in the request for content.

8. The method of claim 7, wherein the entity tag is included within an if-none-match header field of the HTTP request.

9. The method of claim 1, further comprising determining that a change to static content for the resource has occurred, the determination including:
  comparing the version ID associated with the static content of the cached content with a version ID associated with the current version of the resource; and
  providing the static content in its entirety for use in reloading the page if the static portions have changed.

10. A computer-program product, the computer program product comprising computer-readable instructions embodied on tangible, non-transitory media, the instructions operable when executed by at least one computer to:
  receive a request for content for a resource that was previously provided, wherein the request includes an entity tag, wherein the resource includes dynamic content and static content, and wherein the entity tag includes at least a version identifier associated with the static content, a resource identifier associated with the resource, and a dynamic data type;
  determine, using the entity tag, whether the static content is out of date;
  in response to determining that the static content is out of date:
    provide, using the resource identifier, the resource; and
    identify a current version of the dynamic content for inclusion in a cookie associated with the resource;
  in response to determining that the resource is not out of date:
    determine whether the dynamic content is invalid by determining, using the current version of the dynamic content, if the dynamic content has changed since a last time that the resource was requested;
    in response to determining that the dynamic content is invalid:
      generate, using the dynamic data type from the entity tag, a change to the dynamic content;
      update the current version of the dynamic content; and
      generate delta information identifying the change for inclusion in the cookie associated with the resource, wherein only at least a portion of the dynamic content associated with the resource has changed, the delta information included in the cookie associated with a particular location of the corresponding dynamic content within the resource; and
    provide a response that includes the cookie for use in updating the dynamic content, wherein the information stored in the cookie is used by the requesting client to update the portions of dynamic content while maintaining the static portions based on a cached version of the static portions of the resource.

11. The computer-program product of claim 10, further comprising instructions to:
  prior to receiving the request for content for the resource:
    receive a request for content for the resource;
    generate static content and incorporate the static content into the response associated with the resource;
    set the cookie associated with the resource to include at least one dynamic content location for identifying and for generating dynamic content; and
    provide the content in response to the request, including providing the cookie, for use in rendering a cached version of, the content.

12. The computer-program product of claim 11, further comprising instructions to:
  generate a resource identifier associated with the resource;
  determine a dynamic content type associated with the dynamic content;
  generate the dynamic content;
  incorporate the dynamic content into the cookie; and
  assemble an entity tag and include the entity tag in the response.

13. The computer-program product of claim 12, further comprising instructions to:
  determine an identifier associated with the cookie;
  read data from the cookie;
  read the resource identifier;
  read the dynamic content type from the entity tag;
  generate dynamic content for the resource identified by the resource identifier and according to the dynamic data type; and
  update the cookie with the dynamic content.

14. The computer-program product of claim 13, wherein the cookie identifier includes at least the resource identifier and either one of a suffix or a prefix.

15. A system, comprising:
  memory operable to store content, including static and dynamic content; and
  at least one hardware processor interoperably coupled to the memory and operable to perform instructions to:
    receive a request for content for a resource that was previously provided, wherein the request includes an entity tag, wherein the resource includes dynamic content and static content, and wherein the entity tag includes at least a version identifier associated with the static content, a resource identifier associated with the resource, and a dynamic data type;
    determine, using the entity tag, whether the static content is out of date;
    in response to determining that the static content is out of date:
      provide, using the resource identifier, the resource; and
      identify a current version of the dynamic content for inclusion in a cookie associated with the resource;
    in response to determining that the resource is not out of date:
      determine whether the dynamic content is invalid by determining, using the current version of the dynamic content, if the dynamic content has changed since a last time that the resource was requested;

in response to determining that the dynamic content is invalid:
  generate, using the dynamic data type from the entity tag, a change to the dynamic content;
  update the current version of the dynamic content; and
  generate delta information identifying the change for inclusion in the cookie associated with the resource, wherein only at least a portion of the dynamic content associated with the resource has changed, the delta information included in the cookie associated with a particular location of the corresponding dynamic content within the resource; and
provide a response that includes the cookie for use in updating the dynamic content, wherein the information stored in the cookie is used by the requesting client to update the portions of dynamic content while maintaining the static portions based on a cached version of the static portions of the resource.

16. The system of claim 15, further comprising instructions to:
prior to receiving the request for content for the resource:
  receive a request for content for the resource;
  generate static content and incorporate the static content into the response associated with the resource;
  set the cookie associated with the resource to include at least one dynamic content location for identifying and for generating dynamic content; and
  provide the content in response to the request, including providing the cookie, for use in rendering a cached version of, the content.

17. The system of claim 16, further comprising instructions to:
  generate a resource identifier associated with the resource;
  determine a dynamic content type associated with the dynamic content;
  generate the dynamic content;
  incorporate the dynamic content into the cookie; and
  assemble an entity tag and include the entity tag in the response.

18. The system of claim 17, further comprising instructions to:
  determine an identifier associated with the cookie;
  read data from the cookie;
  read the resource identifier;
  read the dynamic content type from the entity tag;
  generate dynamic content for the resource identified by the resource identifier and according to the dynamic data type; and
  update the cookie with the dynamic content.

19. The system of claim 18, wherein the cookie identifier includes at least the resource identifier and either one of a suffix or a prefix.

* * * * *